_(12)_ United States Patent
Tsien et al.

(10) Patent No.: US 7,328,037 B2
(45) Date of Patent: Feb. 5, 2008

(54) METHOD AND APPARATUS TO CONTROL TRANSMITTER

(75) Inventors: Chih C. Tsien, San Diego, CA (US); Jiewen Liu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 10/314,411

(22) Filed: Dec. 9, 2002

(65) Prior Publication Data

US 2004/0110470 A1 Jun. 10, 2004

(51) Int. Cl.
*H04B 7/00* (2006.01)
(52) U.S. Cl. .................. 455/522; 455/41.2; 455/69
(58) Field of Classification Search .............. 455/63.4, 455/69, 522, 561, 562.1, 41.2, 518, 519; 370/318
See application file for complete search history.

(56) References Cited

U.S. PATENT DOCUMENTS

| | | | | |
|---|---|---|---|---|
| 4,638,476 A * | 1/1987 | Acampora et al. | .......... | 370/421 |
| 5,465,398 A * | 11/1995 | Flammer | ...................... | 455/69 |
| 5,706,428 A * | 1/1998 | Boer et al. | .................. | 370/342 |
| 6,321,082 B1 * | 11/2001 | Katz | ........................ | 455/422.1 |
| 6,385,462 B1 * | 5/2002 | Baum et al. | ................. | 455/522 |
| 6,741,861 B2 * | 5/2004 | Bender et al. | .............. | 455/450 |
| 6,859,656 B2 * | 2/2005 | Choi et al. | ................... | 455/522 |
| 7,027,407 B2 * | 4/2006 | Diepstraten et al. | ........ | 370/252 |
| 2002/0036994 A1 | 3/2002 | Huh et al. | | |
| 2002/0154611 A1 * | 10/2002 | Khullar | ....................... | 370/329 |
| 2003/0003905 A1 * | 1/2003 | Shvodian | ..................... | 455/423 |
| 2004/0057507 A1 * | 3/2004 | Rotstein et al. | ............. | 375/219 |

FOREIGN PATENT DOCUMENTS

| | | |
|---|---|---|
| EP | 1 204 225 | 5/2002 |
| EP | 1 207 644 | 5/2002 |

OTHER PUBLICATIONS

International Search Report of PCT/US03/37080.

* cited by examiner

*Primary Examiner*—Edward F. Urban
*Assistant Examiner*—Raymond S. Dean
(74) *Attorney, Agent, or Firm*—Pearl Cohen Zedek Latzer, LLP

(57) ABSTRACT

Briefly, a method to control data transmission rate and transmission power level of a mobile unit is provided. The method may include varying a data transmission rate value based on a difference between a received signal strength and a receiver sensitivity value and reducing the transmission power level when transmission is at the highest data transmission rate.

20 Claims, 3 Drawing Sheets

METHOD AND APPARATUS TO CONTROL TRANSMITTER

BACKGROUND OF THE INVENTION

In modern wireless communication systems such as wireless local area network (WLAN) communication systems, radio transmitters may transmit at a fixed power level. Transmission at a fixed power level may become excessive when the communication distance between a mobile unit (MU) and an access point (AP) may be reduced. Furthermore, when the communication distance between MU and AP is increased, the transmission signal may be too weak. Thus, transmission data rate may be reduced.

One way to overcome the above-described disadvantage may be to adjust the transmission power level by using a close loop power control. In the close loop power control method, the transmission power level from, for example, an AP may be obtained by exchanging messages between the AP and the MU. However, WLAN standards such as, for example "IEEE 802.11b, 1999 Edition", neither address power control issue nor provide enough information to the MU to utilize the close loop power control method.

Thus, there is a need for better ways to mitigate the above-described disadvantages of radio transmitters.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
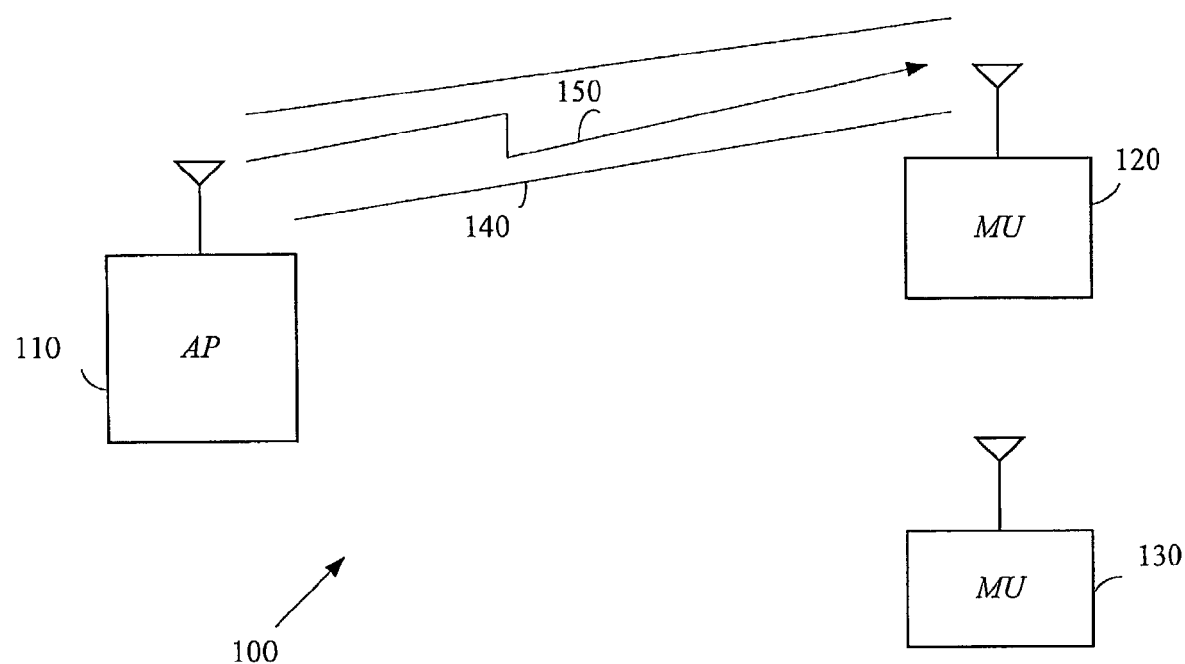
FIG. 1 is a schematic illustration of a portion of a WLAN communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as transmitters of a radio system. Transmitters intended to be included within the scope of the present invention include, by way of example only, wireless local area network (WLAN) transmitters, two-way radio transmitters, digital system transmitters, analog system transmitters, cellular radiotelephone transmitters and the like.

Types of WLAN transmitters intended to be within the scope of the present invention include, although are not limited to, transmitters for transmitting spread spectrum signals such as, for example, Frequency Hopping Spread Spectrum (FHSS), Direct Sequence Spread Spectrum (DSSS) and the like.

Turning to FIG. 1, a WLAN 100 in accordance with the invention is shown. WLAN network 100 may include an access point (AP) 110 and mobile units 120 and 130, although the scope of the present invention is not limited to this example. In one embodiment of the invention, AP 110 may transmit a beacon 150, which may include a broadcast message containing system information, to be received by MU 120. Beacon 150 may be transmitted over an air link 140 using a predetermined data transfer rate, such as, for example, 1 Mega bits per second (Mbps), which may be the lowest transmission rate according to a WLAN standard. Although the scope of the present invention is in no way limited in this respect, the AP 110 and MU's 120, 130 of WLAN 100 may comply with transmission standards, e.g., "IEEE-Std 802.11, 1999 Edition" standard and/or "IEEE-Std 803.11a, 1999 Edition for 5 Giga Hertz (GHz) frequency band" standard and/or "IEEE-Std 803.11b, 1999 Edition for 2.4 GHz frequency band" standard, as are known in the art.

Figure 2:
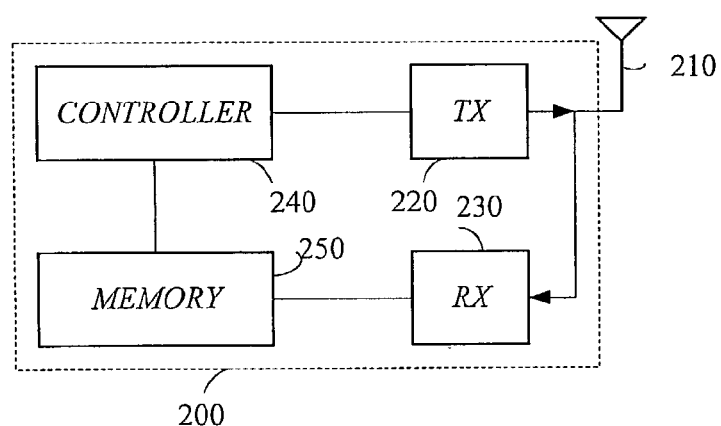
FIG. 2 is a schematic block diagram of a WLAN transceiver according to exemplary embodiments of the present invention.

Turning to FIG. 2, a block diagram of a mobile unit 200 according to embodiments of the present invention is shown. Although the scope of the present invention is not limited in this respect, mobile unit 200 may include an antenna 210, a transmitter (TX) 220, a receiver (RX) 230, a controller 240 and a memory 250.

In operation, antenna 210 for example, a dipole antenna, a shot antenna, or any other suitable type of antenna, may receive a signal from AP 110. The received signal, which may include beacon 150 may contain information representing transmission data such as, for example, a data rate value, e.g., 1 Mbps, and/or other data, such as control messages and the like. Receiver 230 may receive beacon 150 and may provide the data rate value to controller 240. Additionally or alternatively, controller 240 may measure a received signal strength (RSS) value of receiver 230 based on received broadcast messages. Although the scope of the present invention is not limited in this respect, receiver 230 may include a receiver that is able to receive and demodulate spread spectrum signals that may be in use in the WLAN system, if desired.

Although the scope of the present invention is not limited in this respect, memory 250 may store values related to the sensitivity of receiver 230. The receiver sensitivity values may be arranged in a table and may be selected by controller 240 based on the data rate value. In addition, memory 250 may store a plurality of transmission power values. The transmission power values may also be arranged in a table, if desired.

Although the scope of the present invention is not limited in this respect, types of memory that may be used with embodiments of the present invention may include, for example, a shift register, a flip flop, a Flash memory, a random access memory (RAM), dynamic RAM (DRAM), static RAM (SRAM) and the like.

Although the scope of the present invention is not limited to this embodiment, controller 240 may select from the table stored in memory 250 the receiver sensitivity value. The selection of the receiver sensitivity value may be based on the data rate value. In addition, controller 240 may set a data transmission rate value based on the RSS and the selected receiver sensitivity value. Furthermore, controller 240 may select a transmission power level value and set the selected value to transmitter 220. An example of the above-described memory table is provided below.

Although the scope of the present invention is not limited in this respect, controller 240 may include a processor, a digital signal processor and the like. Furthermore, transmitter 220 may transmit data at a data rate substantially equal to the data transmission rate value that may be set by controller 240, if desired. Additionally or alternatively, transmitter 220 may transmit data at transmission power level substantially equal to the selected transmission power value. Although the scope of the present invention is not limited in this respect, transmitter 220 may transmit spread spectrum signal at a predetermined frequency, for example, a 2.4 GHz spread spectrum signal, that may be use in conjunction with the WLAN, if desired.

Figure 3:
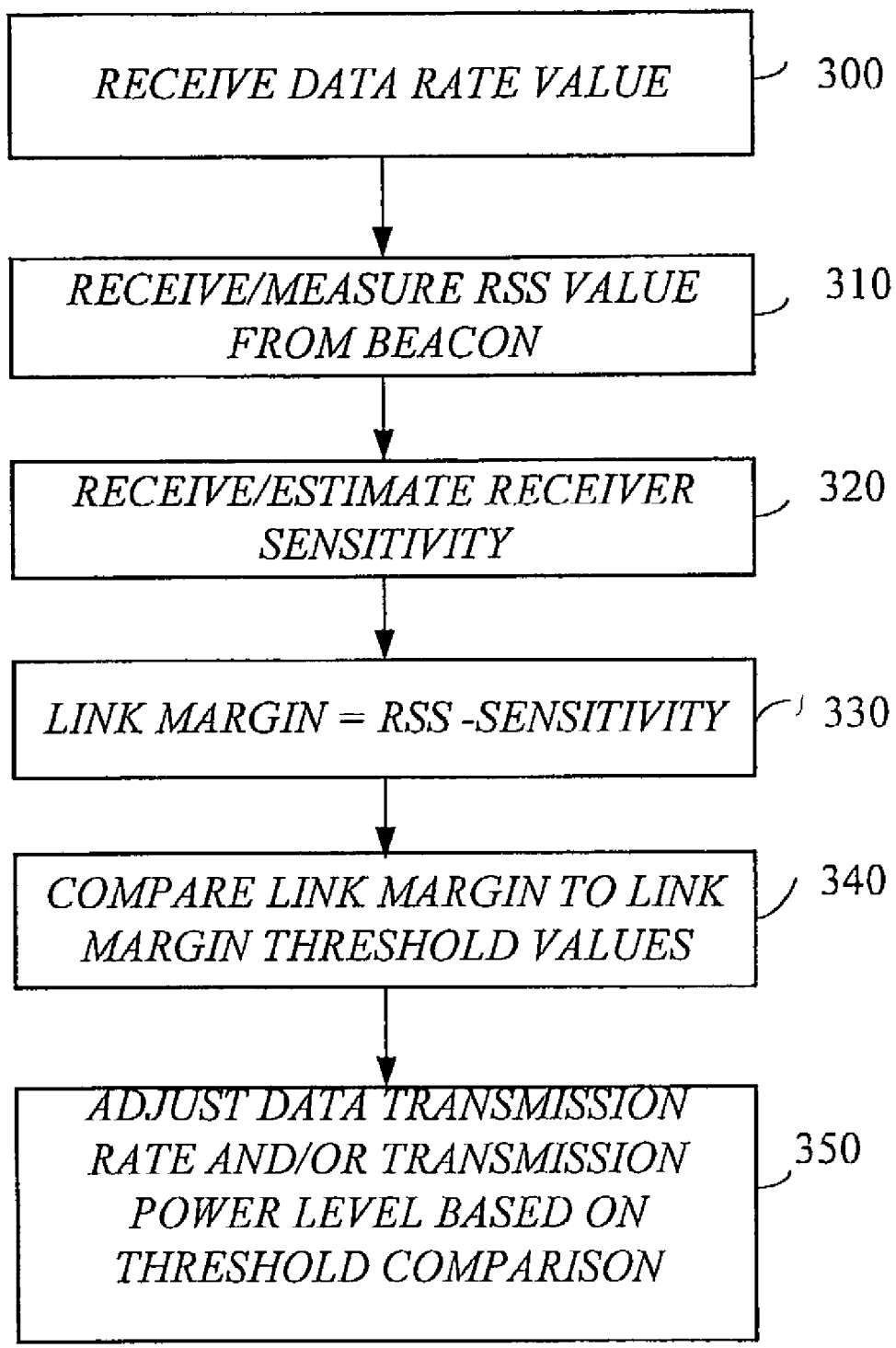
FIG. 3 is a schematic flowchart of a method to control transmission according to exemplary embodiments of the present invention.

Turning to FIG. 3, an exemplary flowchart of a method of controlling a transmission power level according to embodiments of the present invention is shown. Although the scope of the present invention is not limited in this respect, the method may be executed by controller 240. The method may begin with receiving the data rate value (block 300). For example, in one embodiment of the present invention, the data rate value may be contained in the received beacon 150 transmitted from AP 110. Although the scope of the present invention is not limited in this respect, the received data rate value may be used as an initial data transmission rate, if desired.

As shown in block 310, controller 240 may receive or measure the RSS value from beacon 150, which may be transmitted at a given data transmission rate, for example, at the lowest data transmission rate according to the relevant WLAN standard, e.g., 1 Mbps, if desired. Additionally or alternatively, controller 240 may estimate or measure the RSS value according to parameters of broadcast messages received, for example, at the base-band (not shown) of receiver 230. In addition, controller 240 may receive from memory 250 a sensitivity value of the receiver (block 320). Additionally or alternatively, controller 240 may estimate the receiver sensitivity value based on the received data rate value or may select one of a plurality of pre-stored values of the receiver sensitivity based on the received data rate value, if desired.

Table 1 below shows exemplary pre-stored sensitivity values that may be selected based on the received data rate in embodiments of the invention. The pre-stored sensitivity values in Table 1 may be presented in relation to data rate values that may be used with embodiments of the present invention.

TABLE 1

| Data Rate (Mbps) | Sensitivity (dBm) |
|---|---|
| 1 | −91 |
| 2 | −88 |
| 5.5 | −84 |
| 11 | −81 |

In Table 1 the following notation is used:
"Data Rate" may represent the data rate received from beacons; and
"Sensitivity" may represent receiver 230 factory-calibrated sensitivity values.

Although the scope of the present invention is not limited in this respect controller 240 may calculate a Link Margin value, which may be defined as the selected or measured RSS value minus the selected pre-stored sensitivity value, if desired (block 330). As is indicated at block 340, the calculated Link Margin value may be compared to Link Margin threshold values that may include, for example, predetermined values based on the WLAN standard, if desired. Based on the Link Margin threshold comparison, controller 240 may set the appropriate data transmission rate and/or the appropriate transmission power level for the Link Margin, as indicated at block 350.

Although the scope of the present invention is not limited in this respect, Table 2 below shows examples of Link Margin ranges, which may be defined by lower and/or upper threshold values. As shown in the example of Table 2, the controller 240 may perform specified functions, e.g., select a certain data transmission rate and/or transmission power level, depending on the Link Margin range of the calculated Link Margin value. In exemplary embodiments of the invention, the Link Margin range may be determined by comparing the calculated Link Margin value to at least one Link Margin threshold value. The Link Margin ranges may include open ranges, defined by one threshold value, for example, the range of line 5 in Table 2, and/or closed ranges, for example, the ranges of lines 2-4 in Table 2.

TABLE 2

| Line # | Link Margin | Data Rate (Mbps) | Functional Control |
|---|---|---|---|
| 1 | — | 1 | Transmit data rate |
| 2 | 3 dB <= Link Margin <7 dB | 2 | Transmit data rate |
| 3 | 7 dB <= Link Margin <10 dB | 5.5 | Transmit data rate |
| 4 | 10 dB <= Link Margin <13 dB | 11 | Transmit data rate |
| 5 | Link Margin >= 13 dB | 11 | Transmit power level |

In Table 2 the following notations are used:

"Line #" may represent the table line number;

"Link Margin" may represent the difference between RSS value to sensitivity value;

"Data Rate" may represent pre-stored data transmission rate values; and

"Functional Control" may represent contents of control messages.

For example, according to the exemplary first line (1) of Table 2, MU 120 may transmit to AP 110 a control command to transmit data at a data rate of 1 Mpbs. According to the exemplary second line (2) of Table 2, for a Link Margin between 3 dB to 7 dB, MU 120 may transmit to AP 110 a control command that include a control message to transmit data at a data rate of 2 Mbps. According to the exemplary third line (3) of Table 2, for a Link Margin between 7 dB to 10 dB, MU 120 may transmit to AP 110 a control command to transmit data at a data rate of 5.5 Mbps. According to the exemplary fourth line (4) of Table 2, for a Link Margin between 10 dB to 13 dB, MU 120 may transmit to AP 110 a control command to transmit data at data rate of 11 Mbps. Finally, according to the exemplary fifth line (5) of Table 2, for a Link margin equal to or higher than 13dB, the data rate may remain at 11 Mbps and MU 120 may transmit to AP 110 a control command to decrease the transmission power level.

Figure 4:
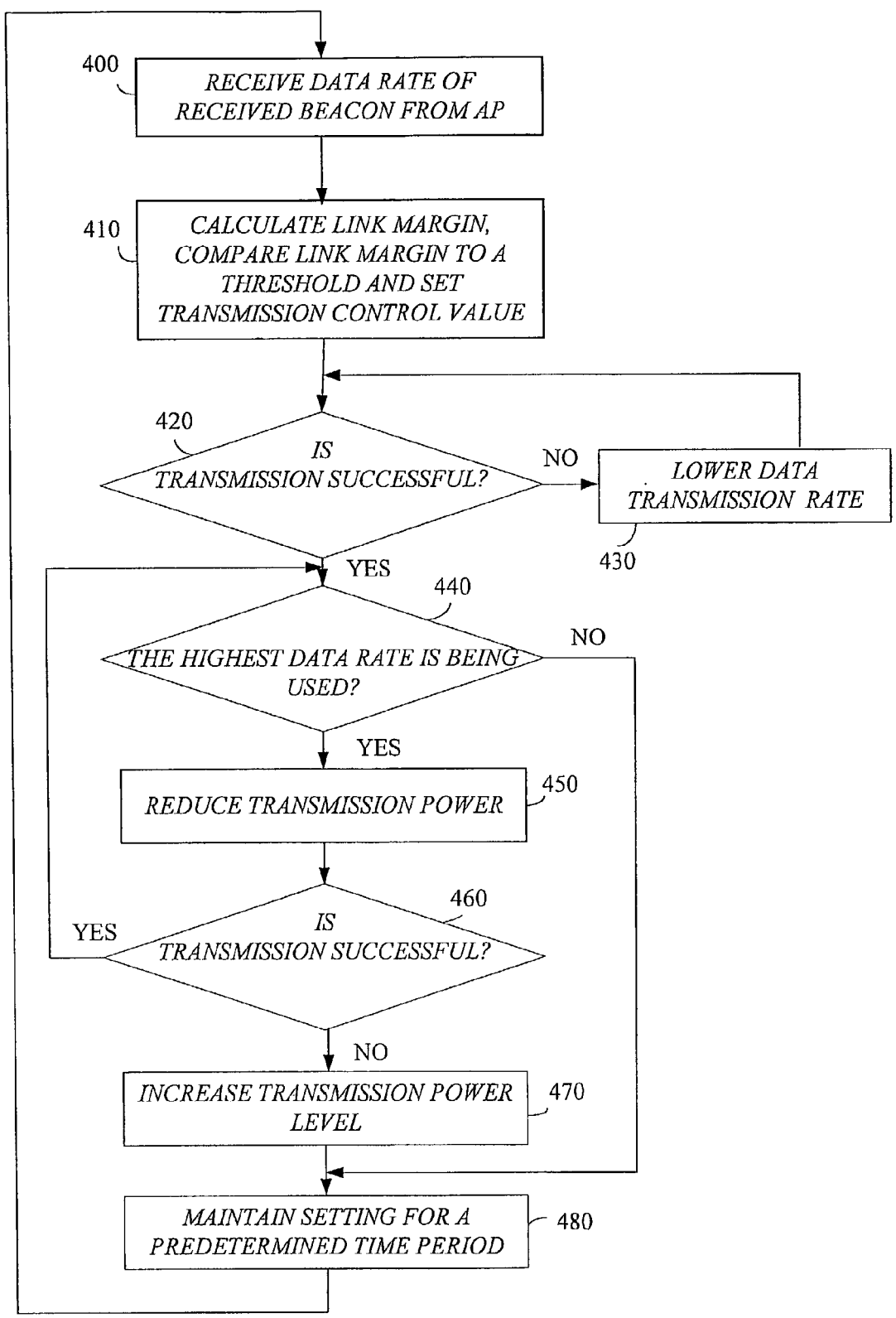
FIG. 4 is a schematic flowchart of an iterative method of setting transmission values according to an exemplary embodiment of the present invention.

Turning to FIG. 4, a flowchart of an iterative method to set and/or adjust data transmission rate and/or transmission power level according to an embodiment of the present invention is shown. Although the scope of the present invention is not limited in this respect, adjustment or setting of the data transmission rate and/or the transmission power level may be performed interactively between MU 120 and AP 110. For example, MU 120 may receive a data rate value (block 400). Controller 240 may calculate the Link Margin, compare the calculated Link Margin to a Link Margin threshold and may set a control value, for example, a data transmission rate value, to be used by MU 120 (block 410).

Although the scope of the present invention is not limited in this respect, MU 120 may transmit data to AP 110 with the selected data transmission rate. In response, if data is received successfully (diamond 420) AP 110 may reply with an acknowledgement message. If the transmission was not successful, the data transmission rate may be reduced to the lower value (block 430), if desired. If the transmission was successful, and the data rate being used is not the highest (diamond 440) the data rate may remain unchanged for a predetermined time period until next iteration (block 480). Varying the data transmission rate value may be repeated until the highest data rate is being used as indicated by diamond 440 block 450 and diamond 460.

Although the scope of the present invention is not limited in this respect, if the highest data transmission rate is being used, for example, 11 Mbps, and the Link Margin is, for example, above 13 dB, then the transmission power level may be reduced by controller 240 (block 450). For example, if desired controller 240 may repeatedly reduce the transmission power level, e.g., in 3 dB increments, until AP 110 no longer responds with an acknowledgement message. Then controller 240 may increase the transmission power level (block 470), for example, in 6 dB increments, and may continue to transmit at the same power level for a predetermined time period (block 480).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. In a wireless local area network, a method of controlling a power level value and data transmission rate of data transmission over an air link, the method comprising:

receiving a beacon including a first data transmission rate value and a received signal strength value;

selecting from two or more pre-stored receiver sensitivity values, a receiver sensitivity value associated with the first data transmission rate value;

calculating a Link Margin value based on a difference between the received signal strength value and the receiver sensitivity value;

selecting from a group of two or more Link Margin ranges a Link Margin range that includes the Link Margin value, wherein the group includes at least a low Link Margin range and a high Link Margin range;

when the selected Link Margin range is below the high Link Margin range, setting a second data transmission rate value based on the selected Link Margin range; and when the selected Link Margin range is the high Link Margin range and the second data transmission rate value is equal to a maximal value of the data transmission rate, adjusting the power level value to be lower or equal to a predefined power level.

2. The method of claim 1, wherein calculating the Link Margin value comprises:

estimating the received signal strength value based on a message received over the air link; and storing the estimated received signal strength value.

3. The method of claim 1, further comprising:

determining the received signal strength value by measuring a parameter of the beacon.

4. The method of claim 1, wherein adjusting the power value comprises:

interactively adjusting the power level value by sending and receiving control messages until receiving the acknowledgement for an adjusted transmission power level value.

5. The method of claim 1, further comprising:

periodically repeating the setting of the second data transmission rate value and the adjusting of the transmission power value.

6. A wireless mobile unit to operate in a wireless local area network, the mobile unit comprising:

a transmitter to attempt to transmit data at a predefined transmission power Level;

a receiver to receive an acknowledgement indicating a status of the attempt to transmit the data; and a controller to select a Link Margin range from a group of Link Margin ranges which includes at least a low Link Margin range and a high Link Margin range according to the acknowledgment, to set a value of data transmission rate according to the selected Link Margin range for Link Margin ranges below the high Link Margin range, and to adjust the transmission power level to be lower or equal to the predefined transmission power when the selected Link Margin range includes the high Link Margin range and the data transmission rate value is a maximum data transmission rate value.

7. The wireless mobile unit of claim 6, comprising:

a memory to provide a pre-stored receiver sensitivity value, wherein the receiver is able to provide a received signal strength value.

8. The wireless mobile unit of claim 7, wherein the controller is able to select the pre-stored receiver sensitivity value from the memory based on the data transmission rate value of the received signal and to calculate a Link Margin value by subtracting the selected pre-stored receiver sensitivity value from the received signal strength value.

9. The wireless mobile unit of claim 7, wherein the memory has stored therein a plurality of transmission power values, and wherein the controller is able to set one of said plurality of transmission power values as an actual transmission power of the transmitter.

10. The wireless mobile unit of claim 7, wherein the memory has stored therein a table of transmission power values and a table of data transmission rate values.

11. An article comprising:
a storage medium having stored thereon instructions that when executed by a controller of a wireless communication device, which is able to operate in a wireless local area network, result in:
controlling a power level value and data transmission rate of data transmission over an air link by:
receiving a beacon including a first data, tranmission rate value and a received signal strength valve;
selecting from two or more pre-stored receiver sensitivity values, a receiver sensitivity value associated with the first data transmission rate value;
selecting from a group of two or more Link Margin ranges a Link Margin range that includes the Link Margin value, wherein the group includes at least a low Link Margin range and a high Link Margin range;
when the selected Link Margin range is below the high Link Margin range, setting a second data transmission rate value based on the selected Link Margin range; and
when the selected Link Margin range is equal to the high Link Margin range and the second data transmission rate value is equal to a maximal value of the data transmission rate, adjusting the power level value to be lower or equal to a predefined power level.

12. The article of claim 11, wherein the instructions of calculating the link margin value when executed result in:
estimating the received signal strength value based on message received over the air link; and
storing the estimated received signal strength value.

13. The article of claim 11, wherein the instructions of calculating the link margin value when executed result in:
measuring the received signal strength value based on a parameter of the beacon.

14. The article of claim 11, wherein the instructions of setting the transmission power value when executed result in:
interactively adjusting the power level value by sending and receiving control messages until receiving the acknowledgement for an adjusted transmission power level value.

15. The article of claim 11, wherein the instructions when executed further result in:
periodically repeating the setting of the data transmission rate value and the adjusting of the transmission power value.

16. A wireless local area network comprising:
an access point and a mobile unit, wherein the mobile unit comprises:
a transmitter to attempt to transmit data to the access point at a predetermined transmission power level;
a receiver to receive an acknowledgement indicating a status of the attempt to transmit the data; and
a controller to select a Link Margin range from a group of Link Margin ranges which includes at least a low Link Margin range and a high Link Margin range according to the acknowledgment, to set the data transmission rate value for Link Margin ranges below the high Link Margin range and to adjust the transmission power level to be lower or equal to the predefined transmission power for the high Link Margin range when the data transmission rate value is a maximum data transmission rate value.

17. The wireless local area network of claim 16, wherein the mobile unit comprises:
a memory to provide a pre-stored receiver sensitivity value,
wherein the receiver is able to provide a received signal strength value.

18. The wireless local area network of claim 17, wherein the controller is able to select the pre-stored receiver sensitivity value from the memory based on the data transmission rate value and to calculate a link margin value by subtracting the selected receiver sensitivity value from the received signal strength value.

19. The wireless local area network of claim 17, wherein the memory has stored therein a plurality of transmission power values, and wherein the controller is able to set one of said plurality of transmission power values as an actual transmission power of the transmitter.

20. The wireless local area network of claim 17, wherein the memory has stored therein a factory-stored receiver sensitivity value and a data transmission rate value.

* * * * *